US012777037B2

(12) United States Patent
Dikshit et al.

(10) Patent No.: US 12,777,037 B2
(45) Date of Patent: Oct. 27, 2026

(54) SECURE-TYPE ETHERNET SEGMENT IDENTIFIER TO INDICATE AUTHENTICATION

(71) Applicant: HEWLETT PACKARD ENTERPRISE DEVELOPMENT LP, Spring, TX (US)

(72) Inventors: Saumya Dikshit, Bangalore (IN); Badrish Havaralu Rama Chandra Adiga, Bangalore (IN)

(73) Assignee: Hewlett Packard Enterprise Development LP, Spring, TX (US)

(*) Notice: Subject to any disclaimer, the term of this patent is extended or adjusted under 35 U.S.C. 154(b) by 63 days.

(21) Appl. No.: 19/169,481

(22) Filed: Apr. 3, 2025

(65) Prior Publication Data

US 2026/0214092 A1 Jul. 23, 2026

(30) Foreign Application Priority Data

Jan. 17, 2025 (IN) ............................ 202541004048

(51) Int. Cl.
*H04L 9/00* (2022.01)
*H04L 9/40* (2022.01)
(Continued)

(52) U.S. Cl.
CPC ...... *H04L 63/0876* (2013.01); *H04L 12/4641* (2013.01); *H04L 45/66* (2013.01)

(58) Field of Classification Search
CPC .. H04L 45/66; H04L 12/4641; H04L 63/0876
(Continued)

(56) References Cited

U.S. PATENT DOCUMENTS 9,066,231 B2 * 6/2015 Chai .................. H04L 63/0892
10,700,893 B1 * 6/2020 Krishnamurthy ... H04L 12/4633
(Continued)

OTHER PUBLICATIONS

Rosen et al., "BGP/MPLS IP Virtual Private Networks (VPNs)," Feb. 2006, Request for Comments: 4364, Network Working Group, <https://www.rfc-editor.org/rfc/rfc4364>, 47 pages.
(Continued)

*Primary Examiner* — Josnel Jeudy
(74) *Attorney, Agent, or Firm* — Hewlett Packard Enterprise Patent Department

(57) ABSTRACT

Systems, methods, and devices for securely adding multi-homed CE devices are provided herein. A MAC address for a second networking device connected to a networking device is received at the networking device via an Ethernet segment. The networking device generates a secure-type Ethernet segment identifier (ESI) for the second networking device. The networking device transmits the secure-type ESI to a third networking device. The secure-type ESI indicates that a port to the second networking device by the third networking device is to be kept operationally down until the second networking device is authenticated. The networking device authenticates the second networking device and sends the secure-type ESI in a subsequent message to indicate that authentication has been completed for the second networking device by the networking device. The subsequent message instructs the third networking device to make the port operational.

20 Claims, 7 Drawing Sheets

(51) Int. Cl.
*H04L 12/46* (2006.01)
*H04L 45/00* (2022.01)

(58) Field of Classification Search
USPC ........................................................... 726/6
See application file for complete search history.

(56) References Cited

U.S. PATENT DOCUMENTS

| | | | | |
|---|---|---|---|---|
| 12,407,611 | B2 * | 9/2025 | Zhang | H04L 12/4641 |
| 2020/0389359 | A1 * | 12/2020 | Lopez | H04L 41/0806 |

OTHER PUBLICATIONS

Sajassi et al., " BGP MPLS-Based Ethernet VPN", Request for Comments: 7432, Feb. 2015, 56 pages.
Sajassi et al., "A Network Virtualization Overlay Solution Using Ethernet VPN (EVPN)", Request for Comments: 8365 , Mar. 2018, 33 pages.
Sajassi et al., "Integrated Routing and Bridging in EVPN draft-ietf-bess-evpn-inter-subnet-forwarding-15", Jul. 26, 2021, 36 pages.
Wikipedia, "IEEE 802.1X," available online at <https://en.wikipedia.org/w/index.php?title=IEEE_802.1X&oldid=1274538691> Feb. 7, 2025, 9 pages.
Wikipedia, "Link aggregation", available online at <https://en.wikipedia.org/w/index.php?title=Link_aggregation&oldid=1277741443>, Feb. 26, 2025, 12 pages.

* cited by examiner

SECURE-TYPE ETHERNET SEGMENT IDENTIFIER TO INDICATE AUTHENTICATION

BACKGROUND

Computing devices, such as desktop computers or servers, may be deployed in one or more fabrics connected using a virtual private network (VPN). For instance, Ethernet VPN (EVPN) may enable transmission of packets via transport layer 2 Ethernet traffic as part of the VPN over wide area networks.

BRIEF DESCRIPTION OF THE DRAWINGS

Features, aspects, and advantages of the present disclosure will become better understood when the following detailed description is read with reference to the accompanying drawings in which like characters represent like parts throughout the drawings, wherein.

DETAILED DESCRIPTION

Figure 1:
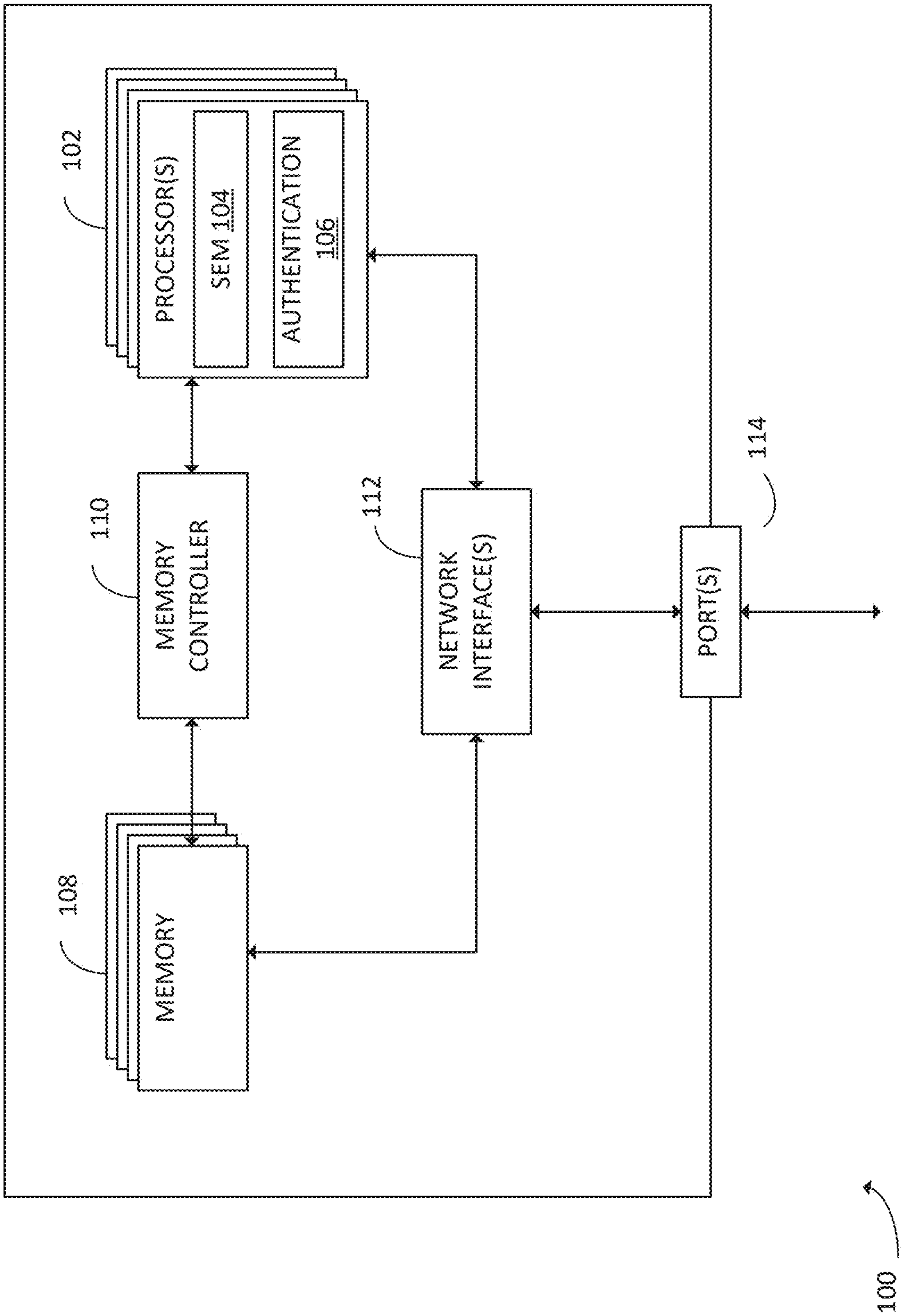
FIG. 1 is a block diagram illustrating an example computing system that includes a secure Ethernet Segment Identifier (ESI) Management (SEM), in accordance with aspects of the present disclosure.

Examples described herein relate to techniques for implementing secure remote connections. For instance, such techniques may include deploying an Ethernet virtual private network (EVPN) extensible local area network (VXLAN). An EVPN VXLAN is an overlay solution that provides deployments in one or more fabrics using VXLAN tunnels. EVPN also enables multihoming to ensure reliability through redundancies in connections. EVPN multihoming is a multi-vendor standard-based redundancy solution that allows a customer site to connect to two or more provider edge (PE) devices to provide redundant connectivity. EVPN multihoming also supports a mass withdrawal mechanism to minimize traffic loss when a link goes down by switching such traffic to other links.

EVPN VXLAN may define, using a border gateway protocol (BGP), a way for VXLAN tunnel endpoints (VTEPs) to discover other VTEPs in the one or more fabrics. However, this discovery may open the networking devices in the EVPN VXLAN to security vulnerabilities if not secured. In some deployments, the method of connecting these devices may rely on link aggregation control protocol (LACP) that may be an unsecured protocol where anyone can spoof packets unless secured using an additional protocol. In other words, LACP, developed for data center usage may not be suited to securing such links and authenticating newly connected devices without more than LACP alone. Each device may be authenticated separately. However, if a multihomed customer edge (CE) device is required to authenticate to each provider edge (PE) device to which it is connected, such authentication may be an inefficient use of network and/or device resources. In examples described herein, a CE device may be a router or other suitable networking device, and a PE device may be a router or other suitable networking device.

To add security and synchronization features to these deployments, a new secure-type Ethernet segment identifier (ESI), such as a new Type 6 ESI, may be derived. For instance, the secure-type ESI may be an extension of ESI type 1 that is based on 802.1AX and LACP. When a PE device learns a MAC address of a CE device over LACP, the PE device may create the secure-type ESI. For instance, the secure-type ESI may be created by combining a type octet (e.g., 0x6), an LACP system MAC address (e.g., 6 octets), and an LACP port key (e.g., 2 octets) of the CE device. With the secure-type ESI, the receiving device may be aware of a device but keep an Ethernet segment port operationally down until one of the PE devices authenticates the CE device using a corresponding authentication protocol (e.g., 802.1X, MAC Authentication Bypass, Network Access Control, etc.). In this state of being operationally down, the Ethernet segment port allows only control packets of a limited number of protocols, such as 802.AX LACP and/or 802.1X.

For example, if a first PE device (PE1) authenticates a CE device, the first PE device may generate the Ethernet-segment route that contains a derived secure-type ESI and may generate a MAC-IP route to contain a MAC of the authenticated CE device. The PE1 also brings up the Ethernet-segment port for the data-traffic after authentication. Once a second PE device (PE2) receives the Ethernet-Segment route (originated from PE1) and if it matches a locally generated secure-type ESI, the PE2 imports the Ethernet-segment route. However, the PE2 keeps the ethernet-segment port operationally down absent authentication first being completed. When the PE2 receives the MAC-IP route for authenticated MAC of the CE device from PE1 carrying the secure-type ESI in a format indicating that the PE1 has already authenticated the CE device, the PE2 may open its port. So, if the MAC address in this subsequent message with an imported MAC-IP route matches with the MAC of the CE device learned via LACP, the PE2 brings-up the ethernet-segment port. Additionally, BGP routes can be exchanged over BGP sessions on IPsec tunnels to ensure the confidentiality of the information specific to result of the authentication. Such a mechanism allows an authentication of the CE device to be shared between multiple PE devices in an efficient manner.

FIG. 1 is a diagram, illustrating an example computing system 100 that has one or more processors 102. The one or more processors 102 may include one or more processing resources, such as a central processing unit (CPU), a graphics processing unit (GPU), implemented using a field programmable gate array (FPGA), or a combination thereof. Functionalities described herein may be implemented via hardware (e.g., electronic circuitry) or a combination of hardware and programming (the combination comprising, e.g., at least one processor and instructions executable by the at least one processor and stored on at least one machine-readable storage medium). For example, the one or more processors 102 may execute various stored instructions, such as instructions executable to implement a secure ESI management (SEM) 104 program and/or an authentication 106 program. Accordingly, the computing system 100 may include any suitable computing devices that may utilize one or more processors 102, such as networking devices (e.g., routers, switches, or the like), servers, desktop computers, laptop computers, cellular devices, and/or other computing devices.

As discussed below, the SEM 104 program may be used to securely generate an ESI and/or limit access to a device (e.g., customer edge device) until authentication has been completed. The authentication 106 program may be used to authenticate the device. In some implementations, at least some functionality in the SEM 104 and/or authentication 106 programs may be at least partially implemented using hard circuitry, such as an application-specific integrated circuit (ASIC).

The programs described herein may be implemented by instructions executed by the one or more processors 102 may be stored in any suitable article of manufacture that includes one or more non-transitory and computer-readable storage media at least collectively storing the instructions or routines. For instance, the instructions may be stored in a memory 108 of the computing system 100. The memory 108 may include any suitable articles of manufacture suitable for storing data and/or executable instructions that may be executed by the one or more processors 102. The memory 108 may include any suitable memory devices, such as random-access memory (RAM), including but not limited to, double data rate type 5 (DDR5) synchronous dynamic random-access memory (SDRAM), double data rate type 4 (DDR4) SDRAM, low-power double data rate (LPDDR) SDRAM, another suitable type of memory device, or any combination thereof. The memory 108 may include one or more different memory devices. Additionally or alternatively, the memory 108 may include a storage device, such as a Non-Volatile Memory Express (NVMe) device, a hard disk drive (HDD), a solid-state drive (SSD), an optical drive, another type of storage device, flash memory, read-only memory (ROM), or any combination thereof.

To facilitate control of the memory 108 and/or exchange of data between the one or more processors 102 and the memory 108, the computing system 100 includes a memory controller 110. The memory controller 110 may be a hardware and/or software component that connects one or more diverse types of memory in the memory 108 to the one or more processors 102 (e.g., via a processor bus of the one or more processors 102). The memory controller 110 may be part of the one or more processors 102 and/or may be implemented on a separate chip mounted on a baseboard of the computing system 100. The memory controller 110 manages data flow between the memory 108 and the one or more processors 102 including memory read and write operations. During a power up of the computing system 100, the memory controller 110 configures and enables use of specific memory devices of the memory 108. Additionally, the memory controller 110 may manage various functions, such as error correction, memory refresh operations, and power management of the memory 108.

The computing system 100 may further include one or more network interfaces 112 that may be implemented by one or more network interface controllers. A network interface controller may be a hardware component or combination of hardware (e.g., processor(s)) and instructions executable by the hardware and that connects the computing system 100 to one or more networks. The network interface (s) 112 provide a connection for the computing system 100 to the network through one or more ports 114.

Figure 2:
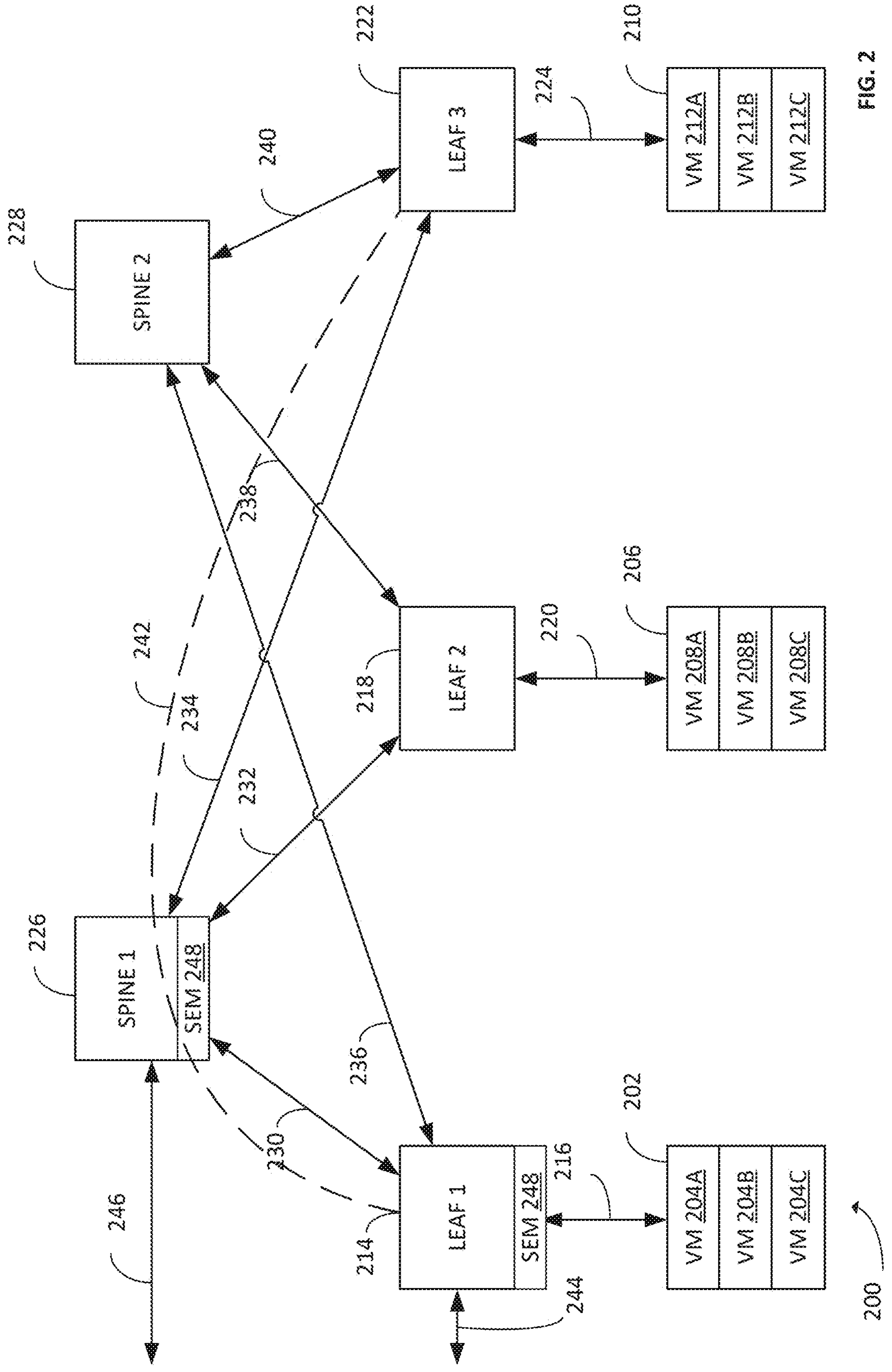
FIG. 2 is a block diagram illustrating an example network that is organized into a spine-leaf architecture and uses SEM, in accordance with aspects of the present disclosure.

FIG. 2 is a block diagram of an example network 200 that is organized into a spine-leaf architecture. Although the network 200 is illustrated as a spine-leaf architecture, in some implementations, the network 200 may be implemented using other architectures. For instance, the network 200 may be implemented in a 3-tier architecture that includes an access tier of networking devices including access switches connecting servers to the network, an aggregation or distribution tier including aggregation switches providing redundant connections to the access switches, and a core tier that includes core switches providing fast transport between aggregation switches. Compared to the 3-tier architecture, the spine-leaf architecture collapses the aggregation and access tiers into a leaf tier and the spine tier functions similar to the core tier. Furthermore, the spine-leaf architecture may be similar to the 3-tier architecture except that, unlike the 3-tier architecture, the spine-leaf architecture does not use the spanning tree protocol and may have a higher interconnection count.

In the spine-leaf architecture, the network 200 includes a server 202 that implements virtual machines 204 (individually referred to as virtual machines 204A, 204B, and 204C). The server 202 may be any suitable computing device with one or more processors to execute instructions, stored in a machine-readable stored medium, to implement the virtual machines 204.

The server 202 connects to a networking device (leaf 1) 214 that connects the server 202 to the network 200. The networking device 214 may have a structure similar to that of the computing system 100 of FIG. 1. In some implementations, the server 202 and the networking device 214 may connect using an Ethernet connection 216 and/or other network connections.

The network 200 also includes a server 206 that implements virtual machines 208 (individually referred to as virtual machines 208A, 208B, and 208C). The server 206 may be any suitable computing device with one or more processors to execute instructions, stored in a machine-readable stored medium, to implement the virtual machines 208.

The server 206 connects to a networking device (leaf 2) 218 that connects the server 206 to the network 200. The networking device 218 may have a structure similar to that of the computing system 100 of FIG. 1. In some implementations, the server 206 and the networking device 218 may connect using an Ethernet connection 220 and/or other network connections.

The network 200 also includes a server 210 that implements virtual machines 212 (individually referred to as virtual machines 212A, 212B, and 212C). The server 210 may be any suitable computing device with one or more processors to execute instructions, stored in a machine-readable stored medium, to implement the virtual machines 212.

The server 210 connects to a networking device (leaf 3) 222 that connects the server 210 to the network 200. The networking device 222 may have a structure similar to the computing system 100 of FIG. 1. In some implementations, the server 210 and the networking device 222 may connect using an Ethernet connection 224 and/or other network connections.

The networking devices 214, 218, and 222 form a leaf (e.g., layer 2) tier that connects the respective servers to the network 200. Although the illustrated implementation of the network 200 includes three leaf tier devices, other implementations of the network 200 may include any suitable number of networking devices in the leaf tier. The networking devices 214, 218, and 222 connect to a spine (layer 3) tier that provides a low-latency transport between leaf switches, networking devices 214, 218, and 222. The spine tier includes a networking device (spine 1) 226 and a networking device (spine 2) 228. Although the illustrated implementation of the network 200 includes two networking devices in the spine tier, other implementations may include any other suitable number of networking devices in the spine tier.

The networking device 226 provides a connection 230 between the networking device 226 and the networking device 214, provides a connection 232 between the networking device 226 and the networking device 218, and provides a connection 234 between the networking device 226 and the networking device 222. These connections 230, 232, and 234 may be the same connection types or may be different connection types. For instance, the connections 230, 232, and/or 234 may include wireless and/or wired connections, such as Ethernet or other suitable connection types.

The networking device 228 provides a connection 236 between the networking device 228 and the networking device 214, provides a connection 238 between the networking device 228 and the networking device 218, and provides a connection 240 between the networking device 228 and the networking device 222. These connections 236, 238, and 240 may be the same connection types or may be different connection types. For instance, the connections 236, 238, and/or 240 may include wireless and/or wired connections, such as Ethernet or other suitable connection types.

The network 200 may use EVPN VXLAN to define control plane operations for VXLAN tunnels, such as a VXLAN tunnel 242 between the networking device 214 and the networking device 222 via the networking device 226. For instance, the network 200 may use the border gateway protocol (BGP) as a mechanism for VXLAN tunnel endpoints (VTEPs), such as the networking device 214 and networking device 222, to discover other VTEPS and connected hosts in the underlay network.

The EVPN VXLAN may be deployed in a centralized architecture or a distributed architecture. In a centralized architecture, all but one of the VTEPs behave as a layer 2 (L2) VTEP and do not function as a layer 3 (L3) gateway for the overlay hosts. In such architectures, the routing between the L2 segments occurs on a centralized VTEP. In a distributed architecture, each VTEP acts as the default gateway for the overlay hosts connected to the VXLAN subnets.

In addition to these different topologies, the network 200 may use integrated routing and bridging (IRB) techniques. IRB may be symmetric or asymmetric. Asymmetric IRB causes all traffic that is to be routed to be routed onto a destination VLAN at the ingress VTEP (e.g., networking device 214), tunneled across the layer 3 infrastructure, and bridged to the destination at the egress VTEP. Asymmetric IRB results in bi-directional VXLAN traffic traveling on different VNIs in each direction across the routed infrastructure. Specifically, the VXLAN traffic always travels on the destination virtual network identifier (VNI). The VNI is a value that identifies a specific virtual network in a data plane, but the traffic traveling between two VTEPs (e.g., networking device 214 and the networking device 222) may be in different VNIs. Accordingly, each source and destination VNIs are present on each VTEP even if the VTEP does not have a host in the VLAN or if there is no requirement for inter-VNI traffic. This increases the number of IP/MAC addresses that each VTEP holds resulting in hitting the hardware scale limitations more easily.

In symmetric IRB, traffic to be routed is routed onto a special transit VNI (i.e., L3VNI) that is tunneled across the L3 infrastructure and then routed off of the L3VNI to the appropriate VLAN and bridged to the destination. EVNP enables such exchange by exporting and importing the hosts as routes instead of neighbors via RouteType-2. Symmetric IRB, bi-directional traffic travels on the same VNI.

In either EVPN, connections may be made outside of the network 200. For instance, if the network 200 is a provider network, one or more networking devices may have connections that extend from the network 200 to a customer network at a customer site. In some implementations, one or more networking devices (e.g., the networking device 214) in the leaf tier may use a connection 244 to connect to the outside network and/or device. Additionally or alternatively, one or more networking devices (e.g., the networking device 226) in the spine tier may use a connection 246 to the outside network and/or device.

Since EVPN may enable multihoming, multiple devices may connect to a single external device to provide redundancy. For instance, multiple leaf switches, multiple spine switches, a combination of leaf switches and spine switches, or any other combination of networking devices may connect to the same external device and/or network. As discussed below, to add security, the networking devices connecting to outside networks and/or devices may utilize secure ESI management (SEM) 248 to generate a secure-type ESI that makes devices aware of the external device but causes devices to wait until the external device is authenticated before opening full communications to the external device. The SEM 248 may be similar to the SEM 104 of FIG. 1 and may be implemented using a processor of the networking devices 214 and/or 226.

Figure 3:
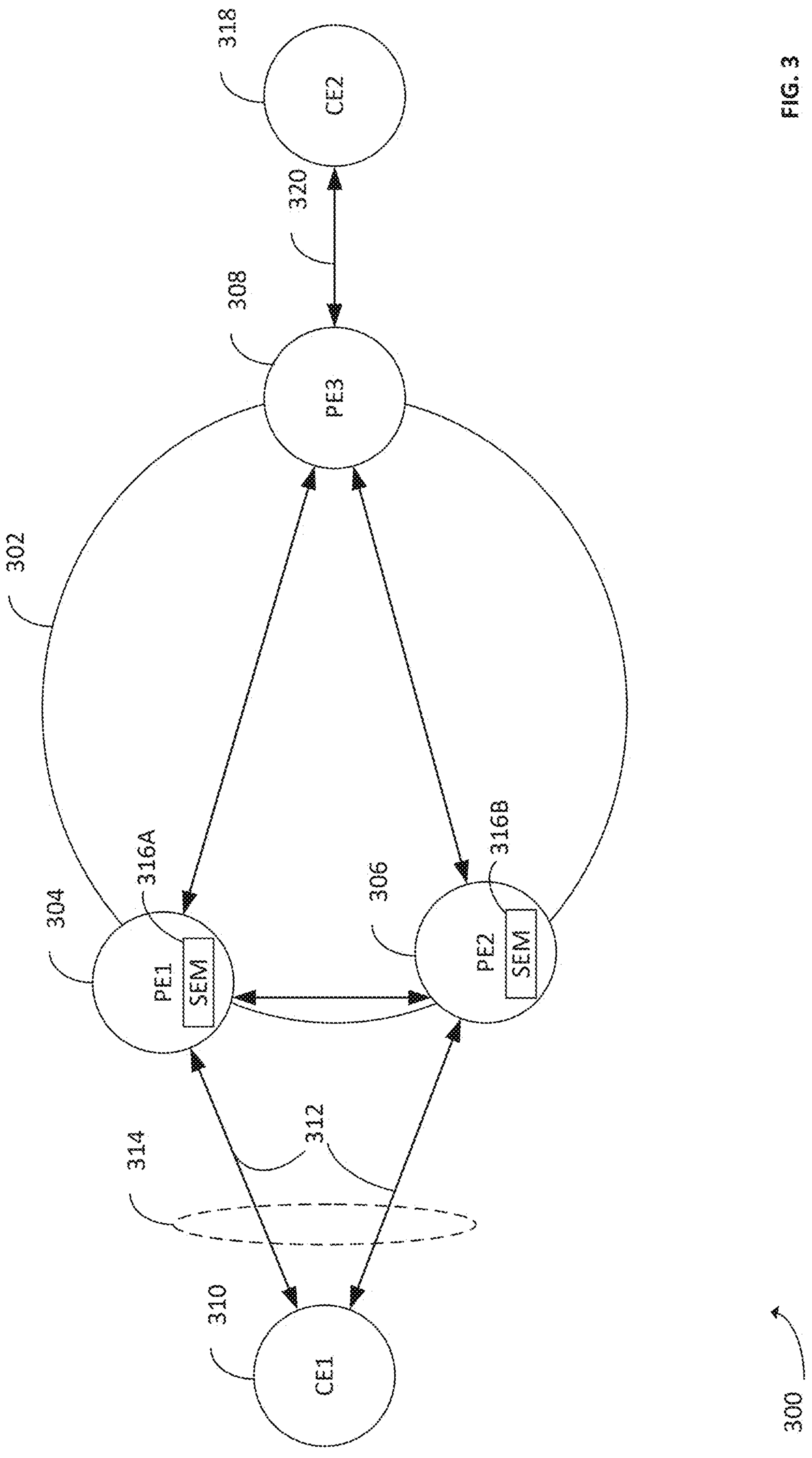
FIG. 3 is a block diagram illustrating an example system that has multihoming deployment with multiple provider edge (PE) devices connecting to a single consumer edge (CE) device to provide redundant service to the CE device, in accordance with aspects of the present disclosure.

FIG. 3 is a block diagram of an example system 300 that has a multihoming deployment. EVPN's multihoming is a multi-vendor standards-based redundancy solution that enables a customer site to connect to two or more provider edge (PE) devices to provide connectivity.

As illustrated, the system 300 includes a provider network 302 that is owned and/or operated by a service provider, such as an Internet Service Provider (ISP). The service provider uses the provider network 302 to provide a service to one or more customers. Although the illustrated implementation includes a single provider network 302, in some implementations, the system 300 may be a multi-fabric system where there are multiple provider networks.

The illustrated implementation of the provider network 302 includes three provider edge (PE) devices: PE1 304, PE2 306, and PE3 308 (collectively referred to as PE devices). In a multi-fabric implementation, the PE devices may be distributed among different fabrics. For instance, the PE1 304 and the PE2 306 may be part of different networks. Although the illustrated implementation of the provider network 302 includes three PE devices, some implementations of the provider network 302 may have fewer or more PE devices. For instance, certain implementations of the provider network 302 may have 1, 2, 10s, 100s, or even 1000s of devices. Each of the PE devices may be a networking device with similar components and functionality to those discussed in relation to the computing system 100 of FIG. 1.

The PE1 304 and the PE2 306 are each connected to a customer edge (CE) device CE1 310. The CE1 310 is multihomed in that it is connected using multiple physical connections 312 from respective PE devices, such as the PE1 304 and the PE2 306. These physical connections 312 (or ports) may be combined into a single virtual link with the combined bandwidth of the ports that is known as a link aggregation group (LAG) 314. For instance, these connections may be Ethernet segments(ES).

The CE1 310 may be outside of the provider network 302. Indeed, in some implementations, the CE1 310 may be part of a customer network located at a customer site. Although only a single CE device is shown with none in network with the CE1, any number of CEs may be connected together in the customer network. For instance, the customer network may be a campus deployment where relatively large numbers of devices may be supported using one or more networks at a single campus even if distributed among different buildings at the campus.

For a multihomed site, each ES is identified by a unique non-zero identifier called an Ethernet Segment Identifier (ESI). The ESI may be manually configured at the PE devices or may be auto derived. Since traditional ESI generation may be related to data centers without the ability to authenticate and synchronize between PE devices, the PE1 304 and the PE2 306 may utilize secure ESI management (SEM) 316 (referred to as SEM 316A and 316B on PE1 304 and PE2 306, respectively) to generate a secure-type ESI that may be transmitted to make other PE devices aware of the external device (e.g., the CE1 310) and to cause devices to wait until the external device is authenticated before opening full communications to the external device through the ports/physical connections 312 and/or the LAG 314. The SEM 316 may be similar to the SEM 104 of FIG. 1 and may be implemented using a processor of the PE1 304 and/or the PE2 306.

In some implementations, the provider network 302 may connect to some devices that are multihomed and some devices that are not multihomed. For instance, the CE1 310 is multihomed via the PE1 304 and the PE2 306, but the provider network 302 may also connect to a CE2 318 that uses only a single connection 320 to the provider network 302. Other devices in a customer network that includes the CE2 318 may also connect to the provider network 302 for redundancy, but the CE2 318 is not multihomed because it is not homed by multiple PE devices. In other words, the CE2 318 does not connect to the provider network 302 via multiple distinct PE devices and their respective ports.

Figure 4:
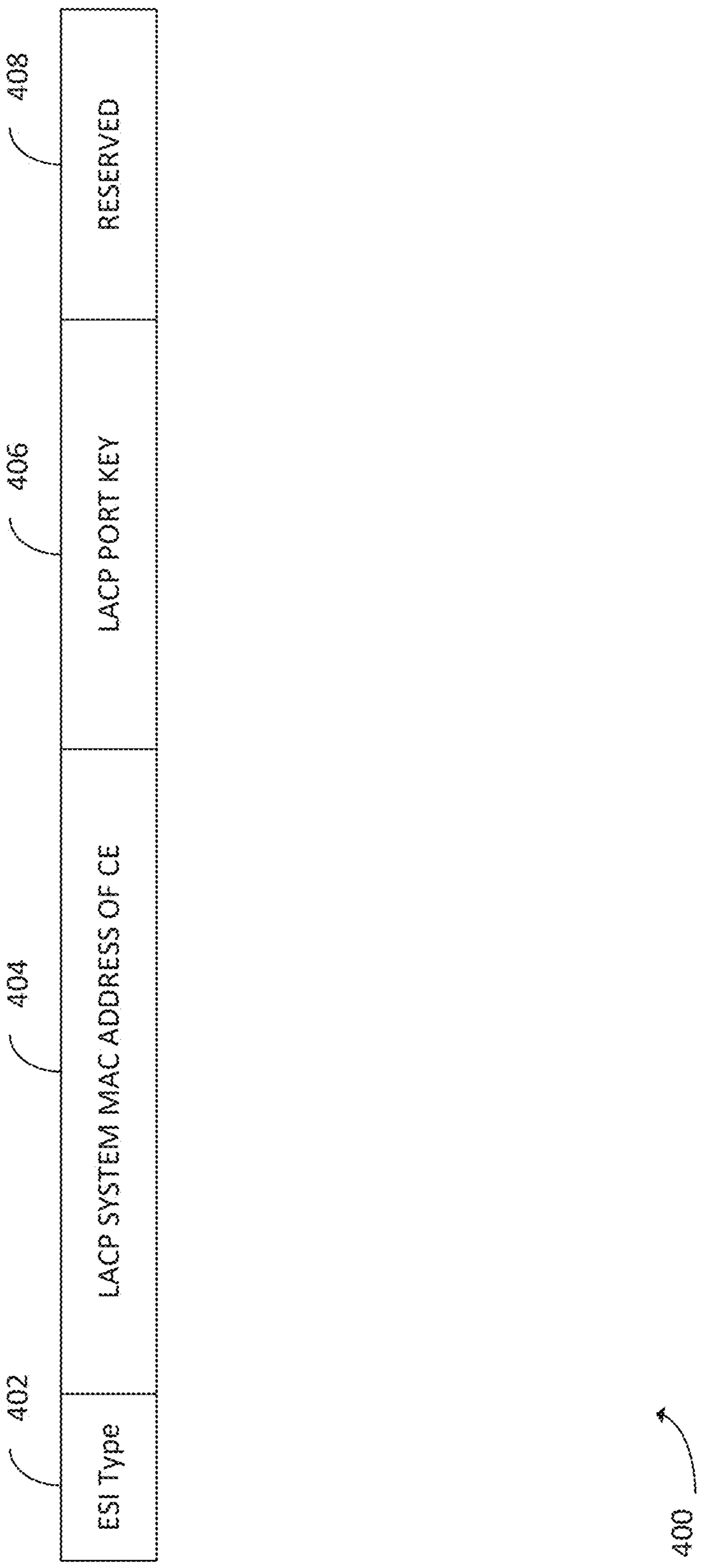
FIG. 4 is a block diagram illustrating an example format of an implementation of a secure-type ESI, in accordance with aspects of the present disclosure.

FIG. 4 is a block diagram of an example implementation of an ESI 400 that may be generated by a PE device, such as the PE1 304 and/or the PE2 306. As illustrated, the ESI 400 includes an ESI type field 402 that indicates a type of ESI generated as defined in EVPN. This field may have a length (e.g., 1 octet) that indicates the type of the ESI 400. For instance, the ESI type field 402 may have a first value (e.g., 0) when the ESI 400 is an ESI type 0 that is a manually hard-coded ESI value. The ESI type field 402 may have a second value (e.g., 1) when the ESI 400 is an ESI type 1 that is an auto-derived value using link aggregation control protocol (LACP). The ESI type field 402 may have a third value (e.g., 2) when the ESI 400 is an ESI type 2 that is used to advertise MAC addresses and optionally IP address information over a network. The ESI type field 402 may have a fourth value (e.g., 3) when the ESI 400 is an ESI type 3 that is an ESI type that uses a MAC address to identify an ES. The ESI type field 402 may have a fifth value (e.g., 4) when the ESI 400 is an ESI type 4 that is a multihoming ES route used to manage an ES (LAG 314) where multiple links connect to the same ES enabling load balancing and/or redundancy. This type usually enables the PE devices to determine the best path to reach a destination when multiple paths are available. The ESI type field 402 may have a sixth value (e.g., 5) when the ESI 400 is an ESI type 5 used to advertise IP prefixes over the network. The ESI type field 402 may have a seventh value (e.g., 6) when the ESI 400 is a secure-type ESI that alerts PEs but holds the ports/LAGs down for communications other than authentication or other limited protocols until authentication has been completed.

The ESI 400 also includes an LACP system MAC address for the CE field 404. This field carries an LACP MAC address that may have a corresponding length (e.g., 6 octets). The LACP MAC address is a predefined multicast MAC address that is used to control the LACP protocol between each port for the CE device (e.g., the CE1 310).

The ESI 400 further includes an LACP port key field 406. This field carries the LACP port key of the CE device (e.g., the CE1 310). The LACP port key field 406 has a corresponding length (e.g., 2 octets). The LACP port key is an identification that controls which ports are eligible for link aggregation. Each port may have an administrative key and an operational key. The administrative key is used to modify the operational key while the operational key is a key that is currently in use in the LAG, such as the LAG 314. The ESI 400 may have one or more bits 408 that are reserved for future use.

Figure 5:
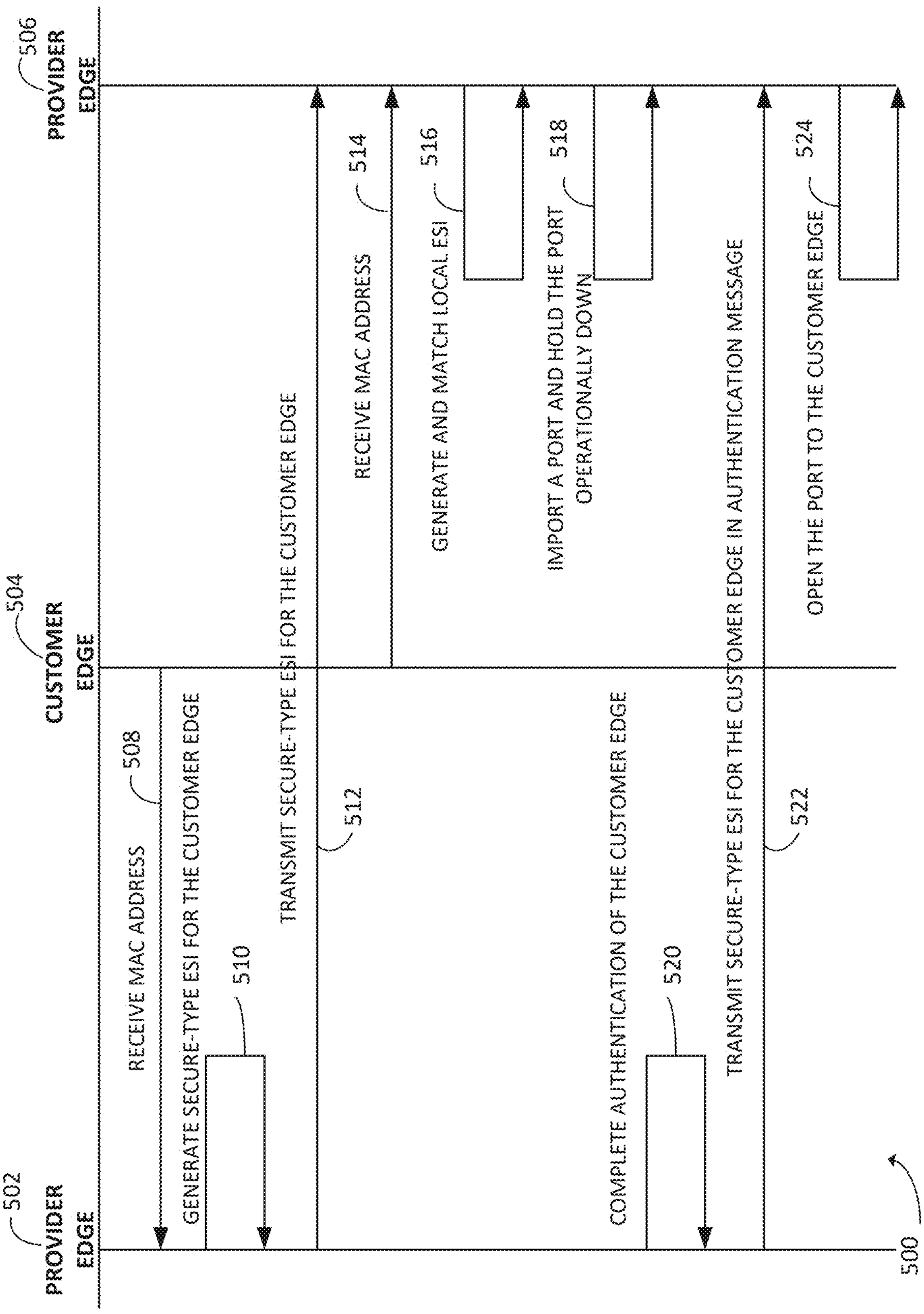
FIG. 5 is a sequence diagram illustrating an example process for using a secure-type ESI, in accordance with aspects of the present disclosure.

FIG. 5 is a sequence diagram of an example process 500 for using a secure-type ESI via a secure ESI management (SEM), such as the SEM 104, 248, and/or 316. As illustrated, the process 500 utilizes a provider edge (PE) device 502 that is part of one or more provider networks, such as the provider network 302. For example, the provider edge device 502 may be the PE1 304 of FIG. 3 and/or may be similar to the PE1 304 or any other suitable PE device.

The PE device 502 connects to a customer edge (CE) device 504, such as the CE1 310. The CE device 504 is outside of the provider network and may be part of a customer network to which the provider network provides a service. As such, the PE device 502 is located at the edge of the one or more provider networks, and the CE device 504 is located at the edge of the customer network. The PE device 502 and the CE device 504 bridge between these networks.

The CE device 504 is multihomed in that it is connected to both the PE device 502 and another PE device 506, such as the PE2 306. The PE device 506 may be part of the same one or more provider networks. For instance, the PE devices 502 and 506 may be located at the same site and part of the same network. Alternatively, the PE devices 502 and 506 may be in different networks. For instance, the PE devices 502 and 506 may be in separate locations, such as different buildings, different states, or even different countries. As such, the PE devices 502 and 506 are located at the edge of the one or more provider networks, and the CE device 504 is located at the edge of the customer network. The PE devices 502 and 506 and the CE device 504 bridge between these networks.

The PE device 502 receives a MAC address (508) from the CE device 504. For instance, the MAC address may be received as part of a discovery mechanism that is part of LACP, BGP, and/or any other suitable protocol. For instance, the MAC address may be received as part of a type 1 ESI message.

The PE device 502 then uses a secure ESI management, such as the SEM 104, 248, or 316 to generate a secure-type ESI (510) for the CE device 504. For instance, the secure-type ESI may be a type 6 ESI message that indicates the existence of the CE device 504 and its connections, such as a LAG, while indicating that such connections are to remain operationally down until authentication has been completed for the CE device 504. The secure-type ESI includes an ESI type field, such as the ESI type field 402, that indicates that the ESI is a secure-type. For example, the ESI type field may include an octet that carries a value (e.g., 6) that indicates the secure-type ESI. The secure-type ESI may include other information, such as the LACP MAC address of the CE device 504 and a corresponding LACP port key.

The PE device 502 then transmits (512) the secure-type ESI for the CE device 504. For instance, the PE device 502 may transmit the secure-type ESI to all other PE devices that may connect to the CE device 504. For example, the PE device 502 may transmit the secure-type ESI to the PE device 506 and/or one or more other PE devices. This transmission of the secure-type ESI may be part of a message type (e.g., EVPN type 4 route) that contains router information to other PE devices in the one or more provider networks.

The PE device 506 may also receive the MAC address (514) from the CE device 504. For instance, the MAC address may be received as part of a discovery mechanism that is part of LACP, BGP, and/or any other suitable protocol. For instance, the MAC address may be received as part of a type 1 ESI message.

The PE device 506 then uses its SEM to generate a local ESI and match it to the received secure-type ESI (516). For instance, the local ESI may be a secure-type ESI like the received secure-type ESI. As previously discussed, the secure-type ESI includes an ESI type field, such as the ESI type field 402, that indicates that the ESI is a secure-type. For example, the ESI type field may include an octet that carries a value (e.g., 6) that indicates the secure-type ESI. The secure-type ESI may include other information, such as the LACP MAC address of the CE device 504 and a corresponding LACP port key. The SEM of the PE device 506 then compares the locally generated ESI and the received secure-type ESI.

When the local ESI and the received secure-type ESI match, the SEM imports the port but holds the port operationally down until the CE device 504 is authenticated (518). Holding the port operationally down may include blocking transmission of data via the port except for a limited number of selected/approved protocols. For instance, data transmitted through the port are limited to control packets of selected protocols pertaining to authentication and/or discovery, such as IEEE 802.1X, IEEE 802.1AX LACP, and the like.

In addition to the PE device 506 holding the port operationally down, the PE device 502 may hold the port operationally down in response to generating the secure-type ESI and before any authentication has been completed for the CE device 504. The PE device 506 then uses a suitable authentication protocol (e.g., IEEE 802.1X) to complete authentication of the CE device 504 (520). Although the illustrated implementation of the process 500 shows the PE device 502 completing authentication of the CE device 504, any PE device, such as the PE device 506, may complete the authentication. Indeed, in some implementations, the PE devices may delegate authentication to a subset of the PE devices. In such implementations, these authenticating PE devices may initiate and complete the authentication process in response to receiving the secure-type ESI from other PE devices or receiving the MAC address of the CE device 504.

After the CE device 504 has been authenticated, the authenticating PE device (e.g., the PE device 502) uses its SEM to transmit the secure-type ESI for the CE device 504 in an authentication message (522). This authentication message is subsequent to the first transmission of the secure-type ESI. Furthermore, this subsequent message may be of a different type than the first transmission. For instance, as previously mentioned, the first transmission of the secure-type ESI may exchange route information (e.g., EVPN type 4 route). The subsequent transmission of the authentication message may be a different type of message. For example, the different type may be an EVPN type 2 message or other type of message that is a different type than the type used for the first transmission of the secure-type ESI. This second message of the different type that references the same ESI after the first transmission of the first type indicates that the CE device 504 has been authenticated and that the CE device 504 may be trusted.

Once the authentication has been completed, the port(s) are opened to the CE device 504 (524). For instance, the PE device 506 may open its port to data transfers beyond control packets from selected protocols. Likewise, before or after transmitting the secure-type ESI in the authentication message but after completing the authentication of the CE device 504, the PE device 502 may open its port.

Figure 6:
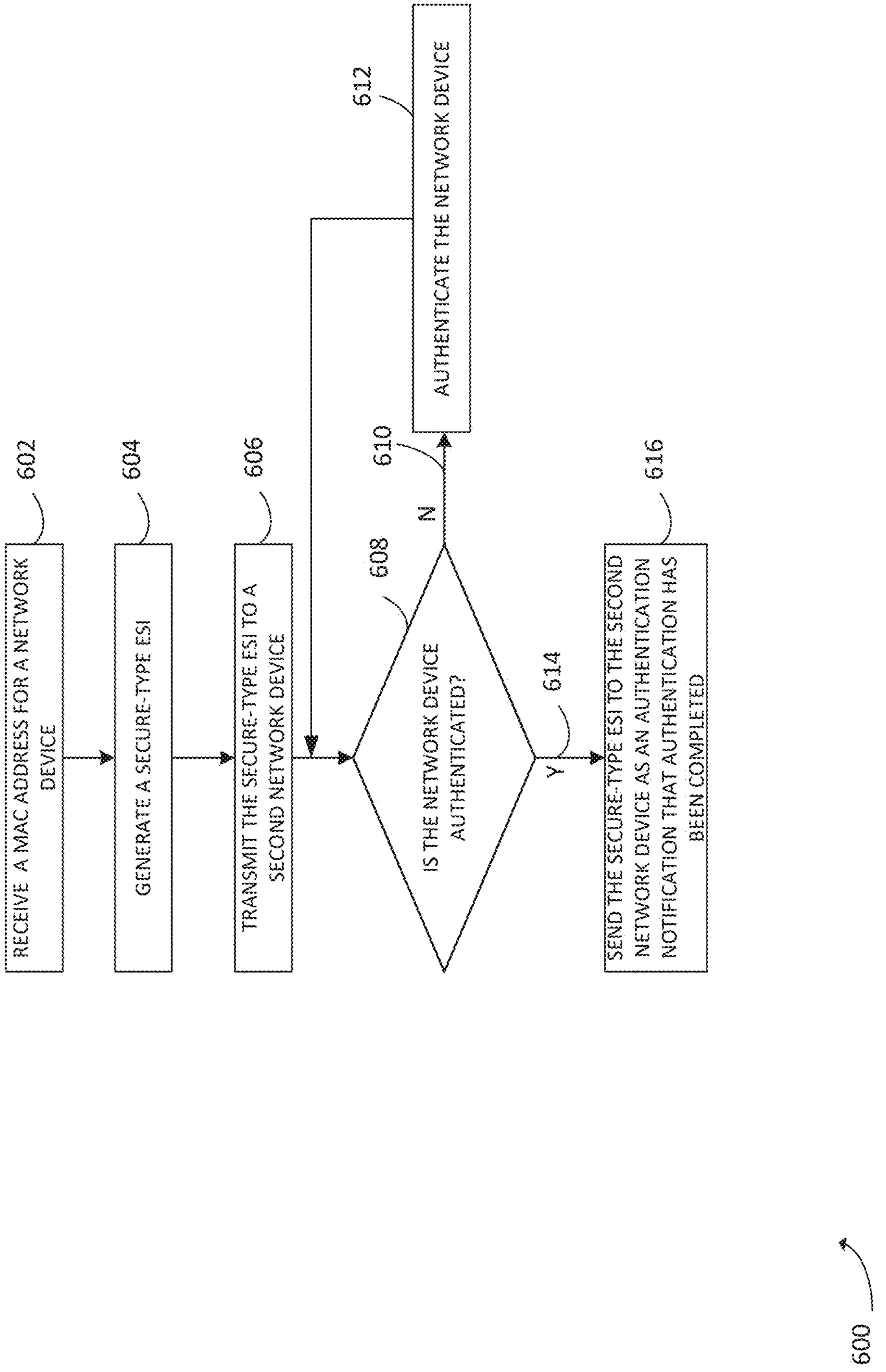
FIG. 6 is a block diagram illustrating an example process for authenticating and securely connecting to a customer device using a secure-type ESI, in accordance with aspects of the present disclosure.

FIG. 6 is a flow diagram of an example process 600 that may be performed by a provider edge (PE) device. For instance, the process 600 may be driven by a processor of a PE device using instructions. For example, the operations may be controlled by a secure ESI management (SEM) program, like the SEM 104, 248, and/or 316, implemented by the processor of the PE device by executing instructions. The PE device is part of the one or more provider networks. For example, the PE device may be similar to and/or function similar to the computing system 100, the PE1 304, the PE2 306, the PE device 502, and/or the PE device 506.

The PE device receives a MAC address of a networking device (block 602). For instance, the networking device may be a customer edge (CE) device that is outside of the one or more provider networks but that can connect to the PE device to bridge between a customer network and the one or more provider networks. The CE device is to be multihomed in that it is to connect to two or more PE devices in the one or more provider networks. The MAC address may be received via and/or for an Ethernet segment(ES) over which communications between the PE device and the networking device are to communicate.

The processor of the PE device then generates a secure-type ESI (block 604). For instance, the SEM may generate the secure-type ESI from the MAC address. Indeed, in some implementations, the secure-type may carry the MAC address along with a type identifier that identifies the ESI as a secure-type (e.g., EVPN type 6) ESI that instructs other PE devices to import the ES, but to hold an ES port connected to the CE device operationally down until the CE device is authenticated. The secure-type ESI may include additional or alternative types of information. In some implementations, the secure-type ESI may have a format similar to that shown in the ESI 400 of FIG. 4.

The processor of the PE device causes the PE device to transmit the secure-type ESI to a second networking device (block 606). The second networking device may be another PE device that is part of the one or more provider networks. For example, the second networking device may be similar to and/or function similar to the computing system 100, the PE1 304, the PE2 306, the PE device 502, and/or the PE device 506. In some implementations, the PE device and the second networking device may be in the same provider network or may be on different fabrics/networks while both housing the CE device to provide redundant connectivity between the one or more provider networks and the CE device. The secure-type ESI may be transmitted to the second networking device via interface controller of the PE device in a first message. Furthermore, the secure-type ESI may be included in the first message having a first message type, such as an EVPN type 4 route that instructs the second networking device to import a port but to hold the port in a at least partially non-operational state until the CE device has been authenticated. Furthermore, in some implementations, the PE device may transmit the secure-type ESI to all PE devices located in the one or more provider networks.

After, before, and/or during transmission of the secure-type ESI in the first message, the PE device checks whether the networking device (CE device) has been authenticated (block 608). For instance, the PE device may store a flag indicating whether the networking device has had authentication verified using a corresponding protocol, such as IEEE 802.1X. This authentication may be performed by the PE device and/or other PE devices, such as the second networking device.

If authentication has not been completed (610), the PE device starts to authenticate the networking device (block 612). For instance, the PE device may use a suitable authentication protocol, such as IEEE 802.1X, to perform such authentication. In some implementations, multiple PE devices may attempt to authenticate the networking device at the same time. For instance, the PE device and the second networking device may both begin attempting to authenticate the networking device. As previously noted, holding the ports to the networking device in an at least partially non-operational state may still enable control packets to be sent through the authentication protocol to enable authentication to take place through the port before the port is rendered fully operational.

Once authentication has been completed (614), the PE device sends the secure-type ESI to the second networking device as an authentication notification indicating that authentication has been completed (block 616). For instance, the authentication notification may be a second message that is subsequent to the first message and that has a second message type that is different than the first message type. For instance, the second message type may be an EVPN type 2 message. This different message type sent later than the first message type indicates that authentication has been completed. Accordingly, the PE device, the second networking device, and/or any other PE devices may open their ports to the networking device.

Figure 7:
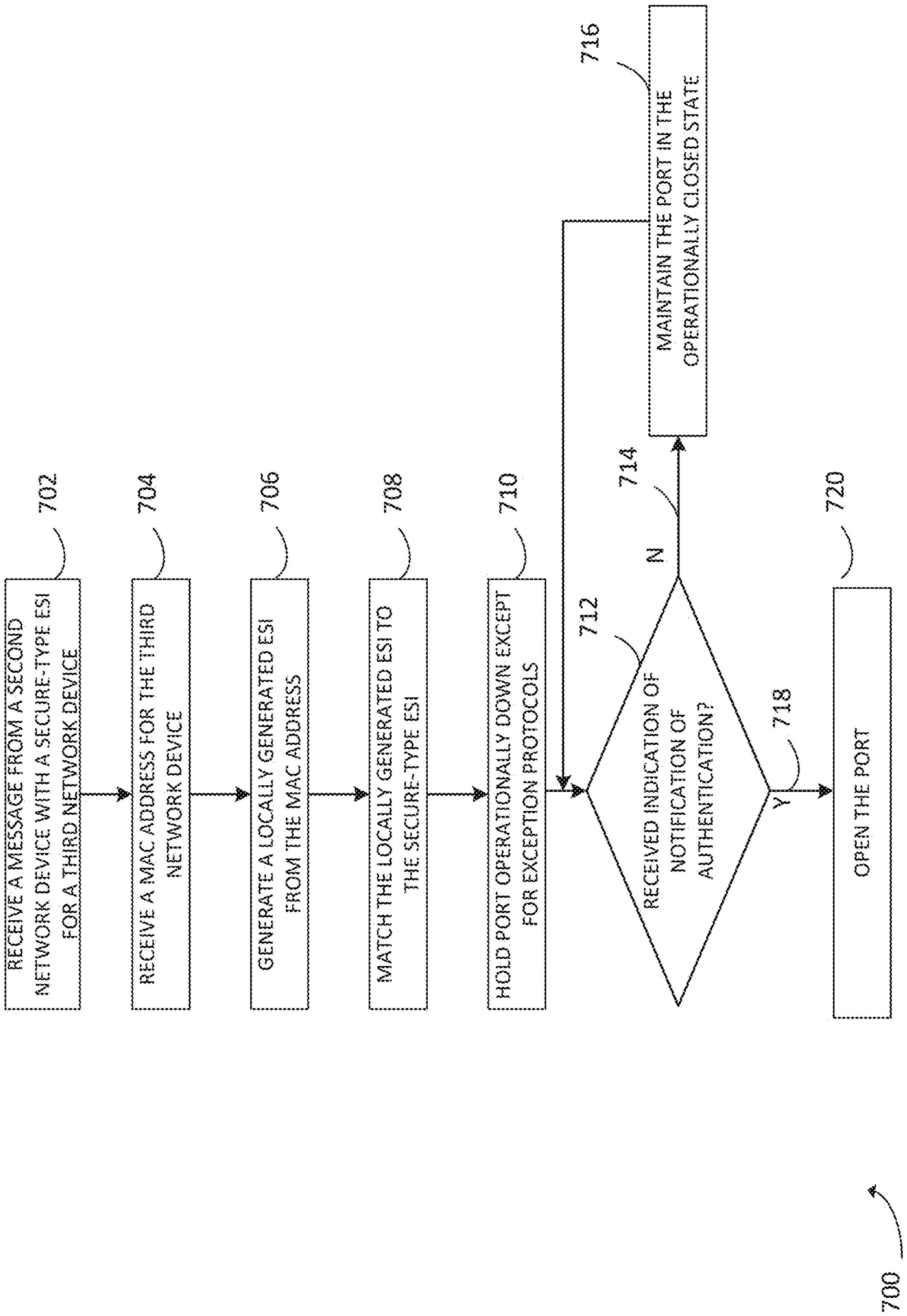
FIG. 7 is a block diagram illustrating an example process for authenticating and securely connecting to a customer device using a secure-type ESI, in accordance with aspects of the present disclosure.

FIG. 7 is a flow diagram of an example process 700 for utilizing a secure-type ESI received at a first networking device from a second networking device to securely multi-home a third networking device. The first networking device may be a first provider edge (PE) device that receives the secure-type ESI from the second networking device that is a second PE device. The first and second networking devices are part of one or more provider networks. The third networking device may be a customer edge (CE) device that is outside of the one or more provider networks but may have a service made available to the CE device via a bridge from the first and second networking devices. The process may be implemented by a secure ESI management (SEM) program, such as the SEM 104, 248, and/or 316, stored as instructions in memory and implemented by the processor of the PE device by executing the instructions.

The networking device receives a message from the second networking device that includes a secure-type ESI for a third networking device and/or its ES (block 702). The secure-type may carry a MAC address for the third networking device and/or its ES along with a type identifier that identifies the ESI as a secure-type. The secure-type (e.g., EVPN type 6) ESI instructs other PE devices, such as the networking device, to hold an ES port operationally down and/or at least partially non-operational until the third networking device is authenticated. For instance, operationally down and/or at least partially non-operational includes blocking transmission of data over the ES port(s) except for a limited number of exceptions. For example, the exceptions may enable control packets that are part of an authentication (e.g., 802.1X) and/or link aggregation (e.g., LACP) protocol to be transmitted through the ES port(s). In some implementations, the secure-type ESI may have a format similar to that shown in the ESI 400 of FIG. 4. The message may have a first type, such as an EVPN type 4 route that enables the networking device to import the ES.

Before or after receiving the message, the networking device receives the MAC address for the third networking device (block 704). For example, this MAC address may be received from the second networking device over the ES.

Using the received MAC address, the SEM causes the processor of the networking device to generate a locally generated ESI (block 706). The locally generated ESI may be generated using a similar mechanism used by the second networking device to generate the secure-type ESI.

The SEM also causes the processor of the networking device to match the locally generated ESI to the secure-type ESI (block 708). For instance, the SEM may match the secure-type ESI to the locally generated ESI using a suitable compare mechanism, such as a bit-by-bit comparison, a hash comparison, and/or any other suitable comparison techniques.

In response to receiving the secure-type ESI, the networking device holds an ES port operationally down except for one or more exception protocols (block 710). Holding the port operationally down except for one or more exception protocols may include blocking data through the ES port except for control packets via an authentication (e.g., IEEE 802.1X) or link aggregation (e.g., LACP) protocols. Furthermore, in addition to holding the port operationally down, the networking device may import the ES port in response to receiving the secure-type ESI from the second networking device.

The SEM executing on the processor causes the networking device to determine whether an indication has been received with a notification of authentication (block 712). For example, the notification of authentication may be a separate message with a second type. For instance, the separate message may be received in a subsequent message from the second networking device indicating that the second networking device has authenticated the third networking device using an authentication protocol, such as IEEE 802.1X. This subsequent message may also include the secure-type ESI in a corresponding message type (e.g., EVPN type 2 message) that indicates that authentication has been completed. In other words, the message matches a type for which the networking device may wait after receiving the secure-type ESI before rendering the ES port operational.

Additionally or alternatively, to the second networking device authenticating the third networking device, the networking device may attempt to authenticate the third networking device itself. As such, the indication may be received from an authentication module in the networking device running on the processor, running on another processor, and/or implemented using hardware circuitry. In such implementations, receiving the indication may include locally authenticating the third networking device using the port using the one or more exception protocols (e.g., IEEE 802.1X).

When indication of notification of authentication has not been received (714), the networking device may maintain the ES port in the operationally closed or down state (block 716). In other words, the networking device may continue to block packets that are not control packets for the one or more exception protocols.

After an indication of notification of authentication has been received (718), the networking device may open the port (block 720). Opening the port may include enabling non-control packets (e.g., data packets) to be transmitted through the ES port. In implementations where the networking device authenticated the third networking device locally, it may send the subsequent message (e.g., EVPN type 2 message) to other PE devices to cause them to open and use respective ES ports.

One or more specific aspects of the present disclosure are described above. In an effort to provide a concise description of these aspects, all features of an actual implementation may not be described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various aspects of the present disclosure, the articles "a," "an," "the," and "said" are intended to mean that there are one or more of the elements. The terms "comprising," "including," and "having" are intended to be inclusive and mean that there may be additional elements other than the listed elements.

While certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A networking device, comprising:

at least one non-transitory machine-readable storage medium comprising instructions; and one or more processing resources configured to execute the instructions to cause the one or more processing resources to:

receive a media access control (MAC) address for a second networking device connected to the networking device via an Ethernet segment;

generate a secure-type Ethernet segment identifier (ESI) for the second networking device;

transmit the secure-type ESI to a third networking device, wherein the secure-type ESI indicates, to the third networking device, that a port of the third networking device to the second networking device is to be kept operationally down by the third networking device until the second networking device is authenticated;

authenticate the second networking device; and in response to authenticating the second networking device, send the secure-type ESI in a subsequent message to the third networking device, wherein the subsequent message indicates that authentication has been completed for the second networking device by the networking device, and instructs the third networking device to make the port of the third networking device operational.

2. The networking device of claim 1, wherein the secure-type ESI comprises a value indicating a secure-type of ESI.

3. The networking device of claim 2, wherein the value comprises a type octet.

4. The networking device of claim 3, wherein the type octet comprises a value of 6.

5. The networking device of claim 1, wherein transmitting the secure-type ESI comprises transmitting the secure-type ESI using a first message type configured to exchange route information to other networking devices in one or more fabrics to which the networking device belongs, and sending the secure-type ESI in the subsequent message comprises transmitting the secure-type ESI in a second message type.

6. The networking device of claim 5, wherein the first message type comprises an Ethernet virtual private network (EVPN) type 4 route, and the second message type comprises an EVPN type 2 message.

7. The networking device of claim 1, wherein the one or more processing resources are configured to, in response to generating the secure-type ESI and before authenticating the second networking device, keep a port of the networking device to the second networking device operationally down.

8. The networking device of claim 7, wherein keeping the port of the networking device to the second networking device operationally down comprises blocking traffic through the port of the networking device except via one or more specified protocols.

9. The networking device of claim 8, wherein the one or more specified protocols comprise an IEEE 802.1X authentication protocol or an IEEE 802.AX link aggregation control protocol (LACP).

10. The networking device of claim 1, wherein authentication is performed by the networking device or by the third networking device.

11. The networking device of claim 1, wherein the networking device and the third networking device are part of a collection of one or more fabrics of which the second networking device is not part.

12. The networking device of claim 11, wherein the networking device comprises a first provider edge device, the second networking device comprises a customer edge device, and the third networking device comprises a second provider edge device.

13. A networking device, comprising:

at least one non-transitory machine-readable storage medium comprising storing instructions; and one or more processing resources configured to execute the instructions to cause the one or more processing resources to:

receive, in a message from a second networking device, a secure-type Ethernet segment identifier (ESI) for a third networking device;

receive a media access control (MAC) address for the third networking device connected to the networking device via an Ethernet segment;

generate a locally generated ESI using the MAC address;

match the locally generated ESI to the secure-type ESI;

hold a port of the networking device to the third networking device operationally down except for one or more exception protocols until an indication of authentication of the third networking device has been received;

receive an indication of an authentication of the third networking device; and in response to receiving the indication of the authentication of the third networking device, open the port of the networking device.

14. The networking device of claim 13, wherein the one or more exception protocols comprise an authentication protocol or a link aggregation protocol.

15. The networking device of claim 13, wherein receiving the indication of the authentication of the third networking device comprises receiving a subsequent message from the second networking device after the message and containing the secure-type ESI.

16. The networking device of claim 15, wherein the message comprises an Ethernet virtual private network (EVPN) type 4 route, and the subsequent message comprises an EVPN type 2 message.

17. The networking device of claim 13, wherein receiving the indication of the authentication comprises:

locally authenticating the third networking device using the port of the networking device using the one or more exception protocols; and sending a message to the second networking device indicating that authentication has been completed for the third networking device.

18. A non-transitory, computer-readable medium, comprising computer-readable instructions that, when executed by one or more processors, cause the one or more processors to:

receive a media access control (MAC) address for a networking device connected to the one or more processors via an Ethernet segment;

generate a secure-type Ethernet segment identifier (ESI) for the networking device;

transmit the secure-type ESI to a second networking device in a first message, wherein the secure-type ESI indicates, to the second networking device, that a port of the second networking device to the networking device is to be kept operationally down by the second networking device until the networking device is authenticated;

authenticate the networking device; and in response to authenticating the networking device, send the secure-type ESI in a second message to the second networking device to indicate that authentication has been completed for the networking device and to instruct the second networking device to make the port of the second networking device operational.

19. The non-transitory, computer-readable medium of claim 18, wherein the instructions are to be executed by a first provider edge device in one or more provider networks to the networking device as a customer edge device, and the second networking device is a second provider edge device in one or more provider networks that provide redundancy to the customer edge device as part of a multi-home Ethernet virtual private network (EVPN) scheme.

20. The non-transitory, computer-readable medium of claim 18, wherein the first message comprises an Ethernet virtual private network (EVPN) type 4 route, and the second message comprises an EVPN type 2 message.

* * * * *